United States Patent [19]

Otsuka et al.

[11] Patent Number: 5,286,684
[45] Date of Patent: Feb. 15, 1994

[54] ALUMINUM OXIDE-BASED SINTERED OBJECT AND PROCESS FOR PRODUCING THE SAME

[75] Inventors: Jun Otsuka; Satoshi Iio; Yo Tajima, all of Aichi, Japan

[73] Assignee: NGK Spark Plug Company, Ltd., Aichi, Japan

[21] Appl. No.: 15,920

[22] Filed: Feb. 10, 1993

[30] Foreign Application Priority Data

Feb. 14, 1992 [JP] Japan ..................... 4-61307
Dec. 4, 1992 [JP] Japan ..................... 4-350612

[51] Int. Cl.⁵ ............................. C04B 35/58
[52] U.S. Cl. ......................... 501/89; 501/91; 501/92; 501/128; 51/309
[58] Field of Search ............ 501/89, 90, 91, 92, 501/128; 51/309

[56] References Cited

U.S. PATENT DOCUMENTS

| | | | |
|---|---|---|---|
| 4,069,060 | 1/1978 | Hayashi et al. | 501/89 |
| 4,889,834 | 12/1989 | Niihara et al. | 501/89 |
| 5,011,799 | 4/1991 | Das Chaklander et al. | 501/89 |
| 5,194,073 | 3/1993 | Winter et al. | 51/309 |

FOREIGN PATENT DOCUMENTS

| | | |
|---|---|---|
| 43-7719 | 3/1943 | Japan . |
| 52-52910 | 4/1977 | Japan . |
| 56-24704 | 6/1981 | Japan . |
| 57-205368 | 12/1982 | Japan . |
| 62-59567 | 3/1987 | Japan . |
| 62-153159 | 7/1987 | Japan . |
| 63-69749 | 3/1988 | Japan . |
| 63-17789 | 4/1988 | Japan . |
| 64-1430 | 1/1989 | Japan . |
| 3-290355 | 12/1991 | Japan . |

*Primary Examiner*—Karl Group
*Assistant Examiner*—Chris Gallo
*Attorney, Agent, or Firm*—Sughrue, Mion, Zinn, Macpeak & Seas

[57] ABSTRACT

An aluminum oxide-based sintered object having excellent abrasion resistance includes α-aluminum oxide, a silicon compound and a tungsten compound, wherein the silicon compound and the tungsten compound are present in amounts based on starting amounts of SiC and W metal of from 5 to 40 mole % and from 0.5 to 25 mole %, respectively, based on the sintered object overall, with a W/SiC molar ratio of 4 or less, and in which particles of at least one of tungsten carbide and tungsten silicide having an average particle diameter of 0.5 μm or less are dispersed as a crystalline phase.

8 Claims, 1 Drawing Sheet

ALUMINUM OXIDE-BASED SINTERED OBJECT AND PROCESS FOR PRODUCING THE SAME

FIELD OF THE INVENTION

The present invention relates to an aluminum oxide-based sintered object suited for use as a material required to have abrasion resistance, e.g., various kinds of tool materials and sliding members, and also to a process for producing the sintered object.

BACKGROUND OF THE INVENTION

Aluminum oxide is known as a material which is relatively inexpensive and has excellent abrasion resistance. Also known is a technique of further improving mechanical properties such as the abrasion resistance or the strength of aluminum oxide by incorporating second phase such as tungsten carbide, as disclosed in JP-B-43-7719, JP-B-56-24704, JP-B63-17789, JP-B-64-1430, JP-A-52-52910, JP-A-57-205368, JP-A-62-59567, JP-A-62-153159, JP-A-63-69749 and JP-A-3-290355 ("JP-B" and "JP-A" disclosed herein mean examined and unexamined Japanese patent publication, respectively).

However, materials obtained by merely incorporating tungsten carbide into aluminum oxide as in the above technique are defective in that the grain diameters thereof are so large that grains may fall off the materials during abrasion. In addition, the incorporation of tungsten carbide in an amount of 5 wt % or less does not produce a sufficient effect, but the incorporation of tungsten carbide in amounts of 5 wt % or more result only in impaired mechanical strength.

Although the cause of the above has not been elucidated, it is presumed, from investigations conducted by the present inventors, that the insufficient or adverse effect of the incorporation of tungsten carbide is attributable to weak interfacial bonding between the aluminum oxide and tungsten carbide and to insufficient size reduction for aluminum oxide particles.

SUMMARY OF THE INVENTION

An object of the present invention is to provide an aluminum oxide-based sintered object which has excellent mechanical strength and abrasion resistance and thus overcomes the above-described problem, and to provide a process for producing the sintered object.

The present invention provides, as one means for attaining the above object of the invention, an aluminum oxide-based sintered object having excellent abrasion resistance which comprises α-aluminum oxide, a silicon compound and a tungsten compound, wherein the silicon compound and the tungsten compound are present in amounts based on starting amounts of SiC and W metal of from about 5 to about 40 mole % and from about 0.5 to about 25 mole %, respectively, based on the sintered object overall, with a W/SiC molar ratio of about 4 or less, and in which particles of at least one of tungsten carbide and tungsten silicide having an average particle diameter of about 0.5 μm or less are dispersed as a crystalline phase.

The present invention further provides, as another means for attaining the above object of the invention, an aluminum oxide-based sintered object having excellent abrasion resistance which comprises α-aluminum oxide, a silicon compound and a tungsten compound, wherein the silicon compound and the tungsten compound are present in amounts based on starting amounts of SiC and W metal of from about 5 to about 40 mole % and from about 0.5 to about 25 mole %, respectively, based on the sintered object overall, with a W/SiC molar ratio of about 4 or less, and in which particles of at least one of tungsten carbide and tungsten silicide having an average particle diameter of about 0.5 μm or less are dispersed as a crystalline phase and a silicon-containing glass is present at grain boundaries.

A preferred means for obtaining such aluminum oxide-based sintered objects is a process which comprises (1) mixing powders of silicon carbide, as SiC, in an amount of from about 5 to about 40 mole %, tungsten, W, in an amount of from about 0.5 to about 25 mole %, and an α-$Al_2O_3$ source constituting the remainder, each of the amounts of SiC and W being based on the sum of the SiC amount, the W amount, and the α-$Al_2O_3$ source amount determined in terms of α-$Al_2O_3$, and the SiC and W being present in a W/SiC molar ratio of about 4 or less, and (2) then sintering the mixture in a non-oxidizing atmosphere at a temperature of from about 1,500 to about 1,900° C.

In the above process, the resulting sinter may be further subjected to a hot isostatic pressure treatment (HIP).

DETAILED DESCRIPTION OF THE INVENTION

Figure 1:
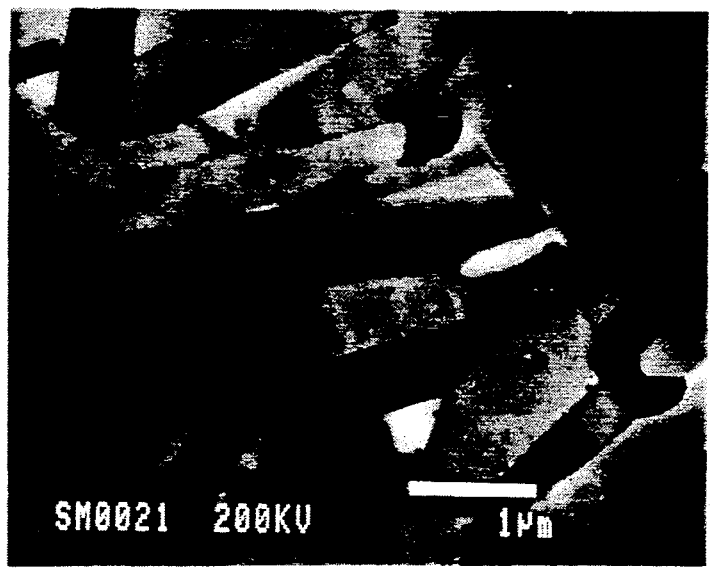
FIG. 1 is a photograph showing the crystalline structure of one embodiment of the sintered object according to the present invention.

As the α-$Al_2O_3$ source for use in the present invention, α-$Al_2O_3$ or any substance which turns into α-$Al_2O_3$ upon sintering in a non-oxidizing atmosphere at a temperature of from about 1,500 to about 1,900° C. may be used. Examples of substances which turn into α-$Al_2O_3$ include γ-$Al_2O_3$ and boehmite.

The mixing of powder ingredients, in which a mole ratio of W/SiC is about 4 or less, preferably 2 or less, may be conducted by an ordinary technique such as wet blending using a ball mill. The sintering may be carried out either with or without the application of pressure.

In the sintered object described above, the presence of tungsten carbide particles dispersed in the sintered object which have an average particle diameter of about 0.5 μm or less has contributed to a particle size reduction for the aluminum oxide, and this particle size reduction and the high abrasion resistance of the tungsten carbide itself combine to improve the abrasion resistance of the sintered object. In the case where a silicon-containing glass, comprising Al-Si-0 or Al-Si-W-0 type glass, is present at grain boundaries, the interfacial bonding strength between aluminum oxide particles and tungsten carbide particles is improved because the glass serves to bond both particles together. Although tungsten carbide can be formed from a wide range of starting compositions, some starting compositions yield tungsten silicide. This tungsten silicide also improves abrasion resistance likewise. However, not all of the silicon is reacted with the tungusten, and is reacted with aluminum oxide of the matrix, small amount of the tungusten and inevitable impurities to form the silicon-containing glass in boundries only when a tungsten containing glass is added. In other words, the silicon does never reacts with tungsten without adding the tungusten containing glass.

Silicon carbide of from about 5 to 40 mole %, preferably 7 to 40 mole %, most preferably 10 to 40 mole % in the process described above serves as both a carbon source for tungsten carbide and a silicon source for tungsten silicide. Since the carbon atoms and the silicon atoms are uniformly coordinated in the silicon carbide used as a raw material, the powder mixture, even when having such a composition as to result in formation of tungsten silicide, gives a sintered object in which tungsten carbide and tungsten silicide are in a uniformly dispersed state. On the other hand, tungsten serves as a tungsten source for a tungsten compound. The combined use of silicon carbide and tungsten yields tungsten carbide particles and tungsten silicide particles which both are finer than the particles of the raw materials, and the tungsten carbide or silicide particles are present at aluminum oxide grain boundaries or within the grains to bring about a particle size reduction for the aluminum oxide and to prevent a decrease in strength. Consequently, there is no need to use expensive ultrafine particles as a raw material.

It should be noted that all of the silicon carbide and tungsten metal used do not always react with each other, and that there are cases where a silicon-containing glass is yielded as a by-product and part of the tungsten metal remains as it is. However, the silicon-containing glass is a useful component as described hereinabove, while the tungsten metal remaining improves thermal conductivity without adversely affecting strength and abrasion resistance. For some applications, such as a cutting tools or wear resistance parts, which cause local heating, it is preferred to allow part of the two ingredients remain unreacted so as to improve thermal conductivity of the present. The ratio of the amount of reaction products to that of the unreacted ingredients can be controlled by changing the starting composition and the sintering temperature.

If the amount of silicon carbide in the raw-material powder is below 5 mole % or the amount of tungsten is below 0.5 mole %, or if the W/SiC ratio exceeds 4, reaction products are not yielded in an amount sufficient to improve abrasion resistance and strength. On the other hand, silicon carbide amounts exceeding about 40 mole % result in poor sintering suitability, while tungsten metal amounts exceeding about 25 mole % are apt to result in the segregation of a tungsten compound, which impairs abrasion resistance.

The raw materials of silicon carbide and metallic tungusten are preferably used in powder state having diameter of about 2 $\mu$m or less, most preferably, about 1 $\mu$m or less, if these ingredients maintain in unreacted state. Whereas, if silicon carbide and tungusten are entirely reacted to form tungusten carbide or tungusten silicide, these are not necessarily pulverized into fine powders. A grain size of several $\mu$ms, such as about 5 $\mu$m, or less, may be sufficient. As regarding particle size of raw aluminum oxide, it is preferable about 2 $\mu$m or less, most preferably 1 $\mu$m or less to maintain activity in sintering process.

The present invention will be explained below in more detail with reference to the following examples, but the invention is not to be construed as being limited thereto. Unless otherwise indicated, all parts, percents, ratios and the like are by weight.

EXAMPLE 1

According to the starting compositions shown in Table 1, $\gamma$-Al$_2$O$_3$ (having a purity of 99% or more and containing a minute amount of $\gamma$-AlOOH and Al(OH)$_3$; average particle diameter, 1 $\mu$m) was wet-blended with SiC ($\beta$ form; average particle diameter, 0.3 $\mu$m) and W (average particle diameter, 0.5–0.6 $\mu$m) by means of a ball mill using ethanol as blending medium. The resulting powder mixtures were hot-pressed at the respective temperatures shown in Table 1 in a carbon die at a pressure of 40 MPa, thereby producing sintered objects (Sample Nos. 1–9).

For the purpose of comparison, a sintered object (Sample No. 10) was produced under the same conditions as those for Sample Nos. 1–9 except that SiC and W were omitted. Further, a sintered object (Sample No. 11) was produced under the same conditions as those for Sample Nos. 1–9 except that SiC was omitted and that WC (average particle diameter, 0.5–0.7 $\mu$m) was used in place of W.

TABLE 1

| | Sample No. | Starting Composition (mol %) | | | W/SiC Ratio | Sintering Temperature (°C.) |
|---|---|---|---|---|---|---|
| | | $\gamma$-Al$_2$O$_3$ | SiC | W[*1] | | |
| Within the claimed invention | 1 | 90.0 | 8.0 | 2.0 | 0.25 | 1500 |
| | 2 | 90.0 | 5.0 | 5.0 | 1.00 | 1500 |
| | 3 | 75.0 | 24.0 | 1.0 | 0.04 | 1700 |
| | 4 | 75.0 | 13.0 | 12.0 | 0.92 | 1500 |
| | 5 | 75.0 | 10.0 | 15.0 | 1.50 | 1500 |
| | 6 | 74.5 | 5.5 | 20.0 | 3.64 | 1500 |
| Outside the claimed invention | 7 | 58.0 | 9.0 | 33.0 | 3.67 | 1500 |
| | 8 | 40.0 | 30.0 | 30.0 | 1.00 | 1600 |
| | 9 | 74.0 | 4.0 | 22.0 | 5.50 | 1500 |
| | 10 | 100 | — | — | — | 1300 |
| | 11 | 97.0 | — | 3.0 | — | 1350 |

Note
[*1]The W content in Sample No. 11 indicates the content of WC used in place of W.

With respect to each of the sintered objects obtained, the crystalline phase(s) constituting the sintered object were identified by X-ray diffractometry, and the density thereof was measured. The results obtained are summarized in Table 2.

TABLE 2

| | Sample No. | Crystalline Phase of Sintered Object | Density[*2] (g/cm$^3$) |
|---|---|---|---|
| Within the claimed invention | 1 | $\alpha$-Al$_2$O$_3$, W$_2$C, WC | 4.01 |
| | 2 | $\alpha$-Al$_2$O$_3$, W$_2$C, W, W$_5$Si$_3$ (slight) | 4.17 |
| | 3 | $\alpha$-Al$_2$O$_3$, WC, W$_2$C, SiC (slight) | 3.89 |
| | 4 | $\alpha$-Al$_2$O$_3$, W$_2$C, W$_5$Si$_3$, WC (slight) | 4.55 |
| | 5 | $\alpha$-Al$_2$O$_3$, W$_2$C, W$_5$Si$_3$ | 4.77 |
| | 6 | $\alpha$-Al$_2$O$_3$, W, W$_2$C | 5.12 |
| Outside the claimed invention | 7 | $\alpha$-Al$_2$O$_3$, W, W$_2$C, W$_5$Si$_3$ | 6.16 |
| | 8 | $\alpha$-Al$_2$O$_3$, W$_2$C, W$_5$Si$_3$, WC | 6.08 |
| | 9 | $\alpha$-Al$_2$O$_3$, W | 5.17 |
| | 10 | $\alpha$-Al$_2$O$_3$ | 3.95 |
| | 11 | $\alpha$-Al$_2$O$_3$, WC | 4.12 |

Note
[*2]All the samples had sufficiently dense state.

As Table 2 shows, the $\gamma$-Al$_2$O$_3$ had turned into $\alpha$-Al$_2$O$_3$, and all the samples had been sufficiently densified.

The sintered object of Sample No. 4 was subjected to microscopic examination in which the surface of the sample which was in parallel with the direction of pressing during the hot pressing was examined with a transmission electron microscope. As a result, it was found that tungsten carbide particles and tungsten silicide particles were dispersed mostly with particle diameters of 100 nm or less as shown in FIG. 1. These diameters were far smaller than those of the silicon carbide and tungsten used as raw materials. In FIG. 1, the rod-shaped particles having a light color are aluminum oxide particles, while the black particles are tungsten compound particles.

Subsequently, each sintered object was evaluated for mechanical strength, fracture toughness, and abrasion resistance. Mechanical strength was determined by measuring three-point bending strength according to JIS-R-1601. Fracture toughness was determined by measuring the fracture toughness value according to the IF method (load, 30 kgf; Vickers hardness was also measured) which is according to JIS-R-1607. Further, abrasion resistance was determined as follows. A carbon steel ring having an outer diameter of 25 mm and an inner diameter of 20 mm was pressed at 300 kgf against each sintered object disk which had been planished. The disk and ring which were being kept pressed against each other were immersed in an oil, for example, an engine oil 30 NS6KI manufactured by Nippon Oil Co., Ltd. and the disk was revolved at a rate of 500 rpm for 5 hours while maintaining the pressed state. Before and after this abrasion test, the surface roughness (maximum height, $R_{max}$) was measured to evaluate the abrasion resistance. The results of these evaluations are summarized in Table 3.

using ethanol as blending medium. Each of the resulting powder mixtures was then compacted by means of cold isostatic pressure in water (CIP). The compacts obtained were sintered in an argon gas atmosphere of ordinary pressure at the respective temperatures shown in Table 4, and the sinters were then subjected to a hot isostatic hydraulic pressure treatment (HIP) at the respective temperatures shown in the table using 2,000-atm argon gas as pressure-transmitting medium. Thus, sintered objects of Sample Nos. 12 to 16 were produced.

TABLE 4

|  | Sample No. | Starting Composition (mol %) | | | W/SiC Ratio | Sintering Temperature (°C.) | HIP Temperature (°C.) |
| --- | --- | --- | --- | --- | --- | --- | --- |
|  |  | α-Al$_2$O$_3$ | SiC | W |  |  |  |
| Within | 12 | 90.0 | 5.0 | 5.0 | 1.00 | 1600 | 1500 |
| the | 13 | 75.0 | 20.0 | 5.0 | 0.25 | 1900 | 1500 |
| claimed | 14 | 75.0 | 13.0 | 12.0 | 0.92 | 1800 | 1700 |
| Invention | 15 | 75.0 | 5.0 | 20.0 | 4.00 | 1700 | 1600 |
|  | 16 | 60.0 | 20.0 | 20.0 | 1.00 | 1900 | 1500 |

The sintered objects obtained were evaluated in the same manner as in Example 1. The results obtained are summarized in Tables 5 and 6.

TABLE 5

|  | Sample No. | Crystalline Phase of Sintered Object | Density (g/cm$^3$) |
| --- | --- | --- | --- |
| Within | 12 | α-Al$_2$O$_3$, W$_2$C, W$_5$Si$_3$ | 4.26 |
| the | 13 | α-Al$_2$O$_3$, W$_2$C, W$_5$Si$_3$, W | 4.23 |
| claimed | 14 | α-Al$_2$O$_3$, W$_2$C, W$_5$Si$_3$, WC (slight), SiC (slight) | 4.74 |
| invention |  |  |  |
|  | 15 | α-Al$_2$O$_3$, W$_2$C, WC | 5.30 |
|  | 16 | α-Al$_2$O$_3$, W$_2$C, WC, Si$_2$W | 5.40 |

TABLE 3

|  | Sample No. | Strength (MPa) | Fracture Toughness (MPa.m$^{0.5}$) | Hardness Hv30 | Surface Roughness (μm)*3 | | |
| --- | --- | --- | --- | --- | --- | --- | --- |
|  |  |  |  |  | Before test | After test | Evaluation |
| Within | 1 | 870 | 2.6 | 1760 | 0.17 | 0.21 | ○ |
| the claimed | 2 | 730 | 2.4 | 1700 | 0.15 | 0.20 | ○ |
| invention | 3 | 970 | 2.5 | 1900 | 0.12 | 0.12 | ○ |
|  | 4 | 850 | 3.1 | 1800 | 0.08 | 0.09 | ○ |
|  | 5 | 730 | 2.4 | 1670 | 0.11 | 0.12 | ○ |
|  | 6 | 740 | 2.6 | 1650 | 0.16 | 0.18 | ○ |
| Outside | 7 | 630 | 3.1 | 1570 | 0.15 | 0.58 | x |
| the claimed | 8 | 630 | 3.4 | 1770 | 0.17 | 0.42 | Δ |
| invention | 9 | 680 | 2.6 | 1590 | 0.21 | 0.73 | x |
|  | 10 | 640 | 2.3 | 1730 | 0.24 | 1.40 | x |
|  | 11 | 540 | 2.8 | 1730 | 0.14 | 0.88 | x |

Note
*3 The evaluation of surface roughness was made based on the following criteria:
○: the ratio of the after-test surface roughness to the before-test surface roughness is 2 or less;
Δ: that ratio is above 2 and not more than 3;
x: that ratio is above 3.

As Table 3 shows, all of the sintered objects within the scope of the present invention were excellent in strength and abrasion resistance. In contrast, the sintered objects of Sample Nos. 7 and 8 showed poor abrasion resistance because of the high W contents exceeding 25%. Similarly, the sintered object of Sample No. 9 showed poor abrasion resistance because of the low SiC content below 5%. Similarly, the sintered objects of Sample Nos. 10 and 11 also had poor abrasion resistance.

EXAMPLE 2

According to the starting compositions shown in Table 4, α-Al$_2$O$_3$ (purity, 99.99% or more; average particle diameter, 0.2 μm) was wet-blended with SiC (β form; average particle diameter, 0.3 μm) and W average particle diameter, 0.5–0.6 μm) by means of a ball mill

TABLE 6

|  | Sample No. | Strength (mPa) | Fracture Toughness (MPa.m$^{0.5}$) | Hardness HV30 |
| --- | --- | --- | --- | --- |
| Within | 12 | 770 | 2.5 | 1990 |
| the claimed | 13 | 720 | 3.7 | 1780 |
| invention | 14 | 830 | 3.6 | 2000 |
|  | 15 | 760 | 2.4 | 1790 |
|  | 16 | 700 | 3.4 | 1790 |

EXAMPLE 3

A powder mixture having the same starting composition as that of Sample No. 4 in Example 1 was prepared by wet blending using a ball mill, and was then heat-treated at 1,350-1,450° C. in a nitrogen gas atmosphere, thereby allowing the γ-$Al_2O_3$ to partly or completely turn into α-$Al_2O_3$. This heat-treated powder was wet-ground again with a ball mill, and then compacted in the same manner as in Example 2. The compact was subjected to 1,800° C. sintering, followed by 1,700° C. HIP treatment (under the same conditions for Sample No. 14, which had the same starting composition). By this method also, a dense sintered object having a density of 4.74 g/cm$^3$ was able to be obtained. The crystalline phases in the sintered object thus prepared were identified by X-ray diffractometry. As a result, the crystalline phases were found to be constituted by α-$Al_2O_3$, $W_5Si_3$, WC, and $Si_2W$.

As demonstrated above, the sintered objects according to the present invention have mechanical strengths of 700 MPa or more and excellent abrasion resistance.

While the invention has been described in detail and with reference to specific embodiments thereof, it will be apparent to one skilled in the art that various changes and modifications can be made therein without departing from the spirit and scope thereof.

What is claimed is:

1. An aluminum oxide-based sintered object having excellent abrasion resistance which comprises α-aluminum oxide, a silicon compound and a tungsten compound, wherein the silicon compound and the tungsten compound are present in amounts based on starting amounts of SiC and W metal of from about 5 to about 40 mole % and from about 0.5 to about 25 mole %, respectively, based on the sintered object overall, with a W/SiC molar ratio of 4 or less, and in which particles of at least one of tungsten carbide and tungsten silicide having an average particle diameter of 0.5 μm or less are dispersed as a crystalline phase.

2. An aluminum oxide-based sintered object as in claim 1, wherein a silicon-containing glass is present at grain boundaries.

3. An aluminum oxide-based sintered object as in claim 1, wherein the amount of silicon carbide is 7 to 40 mole % as based on SiC and the molar ratio of W/SiC is 2 or less.

4. An aluminum oxide-based sintered object as in claim 3, wherein the amount of silicon carbide is 10 to 40 mole % as based on SiC.

5. A process for producing an aluminum oxide-based sintered object which comprises (1) mixing powders of silicon carbide, SiC, in an amount of from about 5 to about 40 mole %, tungsten, W, in an amount of from about 0.5 to about 25 mole %, and an α-$Al_2O_3$ source constituting the remainder, each of the amounts of SiC and W being based on the sum of the SiC amount, the W amount, and the α-$Al_2O_3$ source amount determined in terms of α-$Al_2O_3$, and the SiC and W being present in a W/SiC molar ratio of 4 or less, and (2) then sintering the mixture in a non-oxidizing atmosphere at a temperature of from about 1,500° to about 1,900° C.

6. A process for producing an aluminum oxide-based sintered object as in claim 5, wherein the process further comprises subjecting the sinter resulting from the sintering step to a hot isostatic pressure treatment.

7. A process for producing an aluminum oxide-based sintered object as in claim 5, wherein the amount of silicon carbide is 7 to 40 mole % as based on SiC and the molar ratio of W/SiC is 2 or less.

8. A process for producing an aluminum oxide-based sintered object as in claim 7, wherein the amount of silicon carbide is 10 to 40 mole % as based on SiC.

* * * * *